Nov. 15, 1932.  J. L. MATTHEWS  1,887,560
BEARING SUPPORT FOR TRANSMISSIONS
Filed May 9, 1931
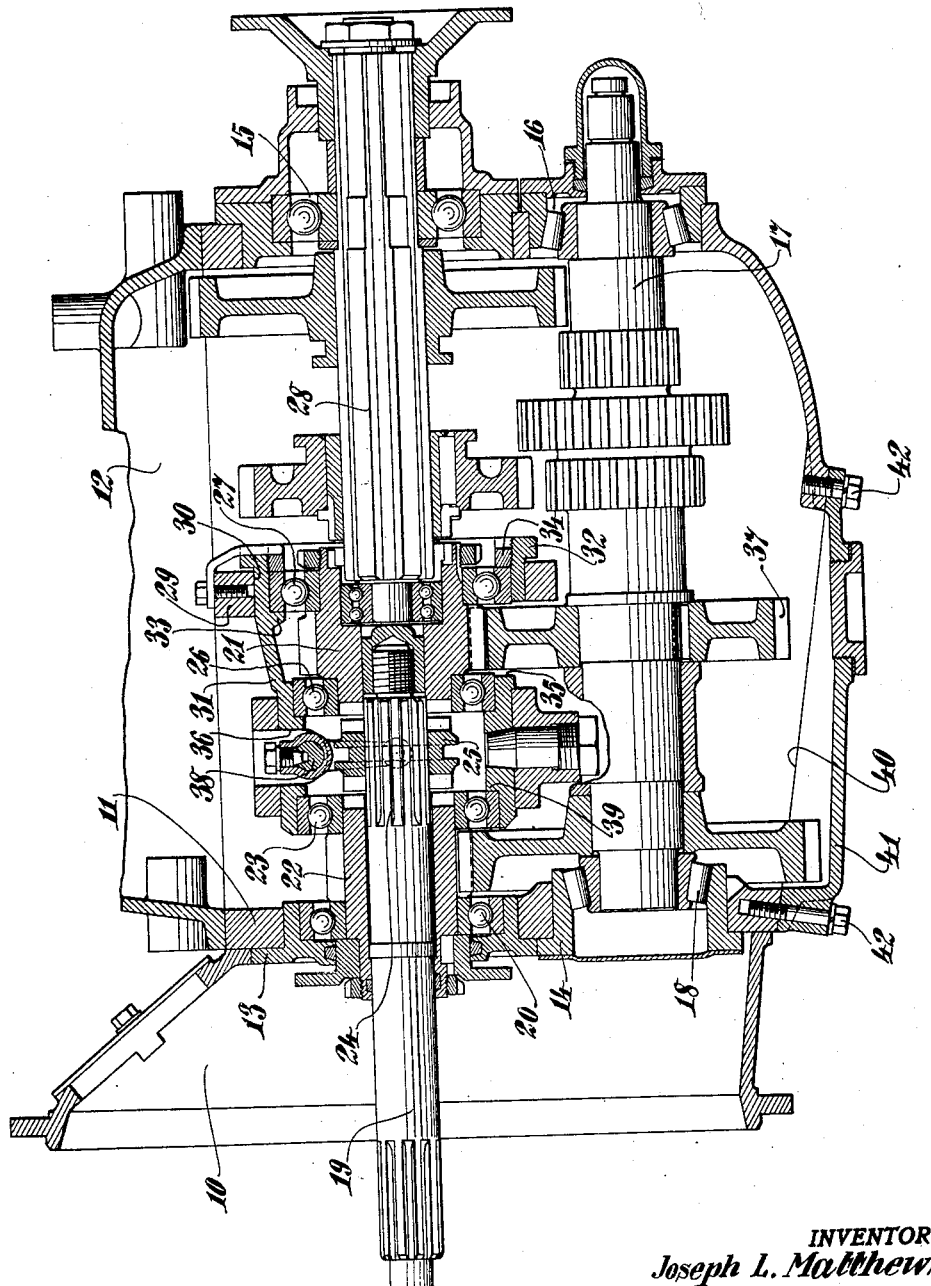
INVENTOR
Joseph L. Matthews,
BY
Redding, Greeley, O'Shea & Campbell
HIS ATTORNEYS Patented Nov. 15, 1932

1,887,560

UNITED STATES PATENT OFFICE

JOSEPH L. MATTHEWS, OF NEW BRUNSWICK, NEW JERSEY, ASSIGNOR TO INTERNATIONAL MOTOR COMPANY, OF NEW YORK, N. Y., A CORPORATION OF DELAWARE

BEARING SUPPORT FOR TRANSMISSIONS

Application filed May 9, 1931. Serial No. 536,209.

The present invention relates to transmission mechanisms for motor vehicles and embodies, more specifically, an improved transmission construction, wherein the bearings for certain of the shafts are mounted in an improved fashion to facilitate the proper positioning thereof and the easy inspection and repair thereof.

Where transmission housings are formed to receive a plurality of shafts and a considerable number of gears and cooperating bearings, as is necessary in transmissions of the so-called multi-range type, the assembly of the transmissions becomes a rather difficult matter. The interior of such housings must be carefully machined in order that certain of the bearings may be properly aligned and the accurate machining of these portions of the housings necessary to insure such alignment and space the bearings properly, gives rise to considerable difficulty during the manufacture and assembly of the parts.

An object of the invention, accordingly, is the provision of an improved transmission housing for mounting a plurality of aligned shafts upon bearings in such fashion that the proper space and alignment of the bearings is readily effected.

A further object of the invention is to provide a transmission housing of the above character wherein aligned driving and driven shafts are mounted upon bearings which are positioned and properly spaced by means of a retainer sleeve which may be separately machined and finished prior to the assembly of the parts of the transmission.

A further object of the invention is to provide an improved transmission housing wherein provision is made for readily assembling the shafts within the housing, such operation being effected by snaking of the shafts through a housing structure including an aperture which is inclined with respect to the axis of the housing.

Further objects of the invention, in addition to those specifically enumerated above will be apparent as the invention is described in detail in connection with the accompanying drawing, wherein the single figure is a view in section taken through a transmission constructed in accordance with the present invention, the plane of the section passing through the longitudinal axis of the transmission.

With reference to the above drawing a clutch bell housing is indicated at 10 to which is secured a transmission housing 11 provided with a cover 12 which may mount suitable controlling mechanism in accordance with well known practice. The housing is provided with bearing rings 13 and 14 for mounting the forward bearings of the driving and countershafts, respectively. Bearings 15 and 16 are provided for journaling the rear ends of the driven shaft and countershaft, respectively, these bearings being mounted in the rear wall of the transmission housing 11.

A countershaft 17 is journaled at its rear extremity in the bearing 16 and at its forward extremity in a bearing 18 carried by the ring 14. Driving shaft 19 is journaled in a gear 22, in the forward extremity of the transmission housing, and is centered by a gear 21 which is mounted in a manner to be described hereinafter. The gear 22 is mounted over the driving shaft 19, this gear being journaled by the bearing 20 and by a second bearing 23. Upon a splined portion 24 of the driving shaft 19 is a sliding clutch 25 which engages mating clutch teeth formed on gear 22 and similar teeth formed on gear 21. Gear 21 is journaled in bearings 26 and 27 and centers a driven shaft 28 which preferably carries sliding gears in accordance with well known practice.

Within the housing 11, a bracket or partition 29 is mounted, this partition being formed with an aperture 30 which receives a sleeve 31. The sleeve is provided with a flange or shoulder 32, which is of such diameter as to enable it to be inserted through the usual apertures formed in the ends of the transmission housing and an inwardly extending flange or shoulder 33 is formed within the sleeve and seats the bearing 27, a positioning ring 34 being threaded down against the outer bearing race to position the bearing properly.

The sleeve 31 is cut away at 35 and at 36 to receive a gear 37 on the countershaft 17 and rock shaft 38. Rock shaft 38 is provided with a suitable fork to engage the clutch 25 in accordance with well known practice and the sleeve 31 is formed with an inwardly extending annular rib 39 which provides shoulders against which the bearings 23 and 26 are seated. In this fashion, the sleeve 31 may be finished prior to assembly within the transmission housing and the bearings for the several rotating parts are thus readily and effectively mounted in the desired positions.

In order that the countershaft 17 may be assembled as a unit prior to its insertion within the housing, the bottom of the latter is formed with an aperture 40, the plane of which slopes with respect to the axis of the housing. A cover plate 41 cooperates therewith and is adapted to be secured over such aperture by means of bolts 42, the cover thus constituting part of the bottom of the casing and one end wall. In this fashion countershaft 17 may be snaked into the housing by inserting the right hand end thereof first and moving the shaft bodily toward the right, as viewed in the drawing, until the left hand end of the shaft clears the left end wall of the housing, at which time the shaft is lifted into the position shown and the bearings secured.

From the foregoing, it will be seen that a transmission housing has been provided, wherein the bearings are readily and effectively seated in position and maintained in such position, the elements being of such character as to enable them to be finished easily and readily assembled.

While the invention has been described with specific reference to the accompanying drawing, it is not to be limited, save as defined in the appended claim.

I claim as my invention:

In combination with a transmission housing and a bracket secured therein, a flanged sleeve carried removably by the bracket, means to secure the sleeve in the bracket with the flange thereof against the bracket, a plurality of spaced shoulders formed in the sleeve and facing in one direction to position aligned bearings and a shoulder spaced from the first shoulders and facing in the opposite direction, said sleeve being formed with an aperture to receive a transmission gear.

This specification signed this 24th day of April A. D. 1931.

JOSEPH L. MATTHEWS.